(12) United States Patent
Grether

(10) Patent No.: US 6,568,153 B2
(45) Date of Patent: *May 27, 2003

(54) COVER FORMING APPARATUS

(75) Inventor: Stephan Grether, Somis, CA (US)

(73) Assignee: Southpac Trust Int'l. Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/290,804

(22) Filed: Nov. 7, 2002

(65) Prior Publication Data

US 2003/0061787 A1 Apr. 3, 2003

Related U.S. Application Data

(63) Continuation of application No. 09/574,654, filed on May 18, 2000, now Pat. No. 6,502,368.
(60) Provisional application No. 60/135,321, filed on May 20, 1999.

(51) Int. Cl.$^7$ ............................................... B65B 13/02
(52) U.S. Cl. ............................ 53/399; 53/219; 53/221; 53/390; 53/582
(58) Field of Search .................... 53/399, 414, 464, 53/218, 219, 221, 222, 592, 582, 583, 390, 397, 385; 100/9; 47/72, 65.5, 66.7; 206/423

(56) References Cited

U.S. PATENT DOCUMENTS

| | | | |
|---|---|---|---|
| 2,236,936 A | 4/1941 | Camp | 100/31 |
| 2,514,038 A | 7/1950 | Doolittle | 226/129 |
| 3,974,762 A | 8/1976 | Kita et al. | 100/9 |
| 4,280,314 A | 7/1981 | Stuck | 53/241 |
| 4,470,241 A | 9/1984 | Parry et al. | 53/556 |
| 4,480,536 A | 11/1984 | Burns | 100/6 |
| 4,555,893 A | 12/1985 | Nakata et al. | 53/390 |
| 4,570,415 A | 2/1986 | Centeno | 53/399 |
| 4,640,079 A | 2/1987 | Stuck | 53/390 |
| 5,417,033 A | 5/1995 | Weder | 53/399 |
| 5,426,914 A | 6/1995 | Weder et al. | 53/399 |
| 5,473,858 A | 12/1995 | Hayes | 53/414 |
| 5,921,060 A | 7/1999 | Straeter | 53/176 |

*Primary Examiner*—Stephen F. Gerrity
*Assistant Examiner*—Thanh Truong
(74) *Attorney, Agent, or Firm*—Dunlap Codding & Rogers

(57) ABSTRACT

A cover forming apparatus and method for forming and securing a sheet of material about a flower pot having an outer peripheral surface is provided. The cover forming apparatus includes a former. The former has a bowl shaped configuration and an open upper end, a lower end, a sidewall extending from the open upper end to the lower end, and a pot opening. The sidewall has an outer surface and an inner surface with the outer surface having an upper inwardly tapered portion. The pot opening is sized to receive at least a portion of the flower pot together with the sheet of material such that upon disposing the flower pot into the pot opening with the sheet of material positioned between the upper end of the former and the flower pot causes the sheet of material to be formed about the outer peripheral surface of the flower pot.

10 Claims, 6 Drawing Sheets

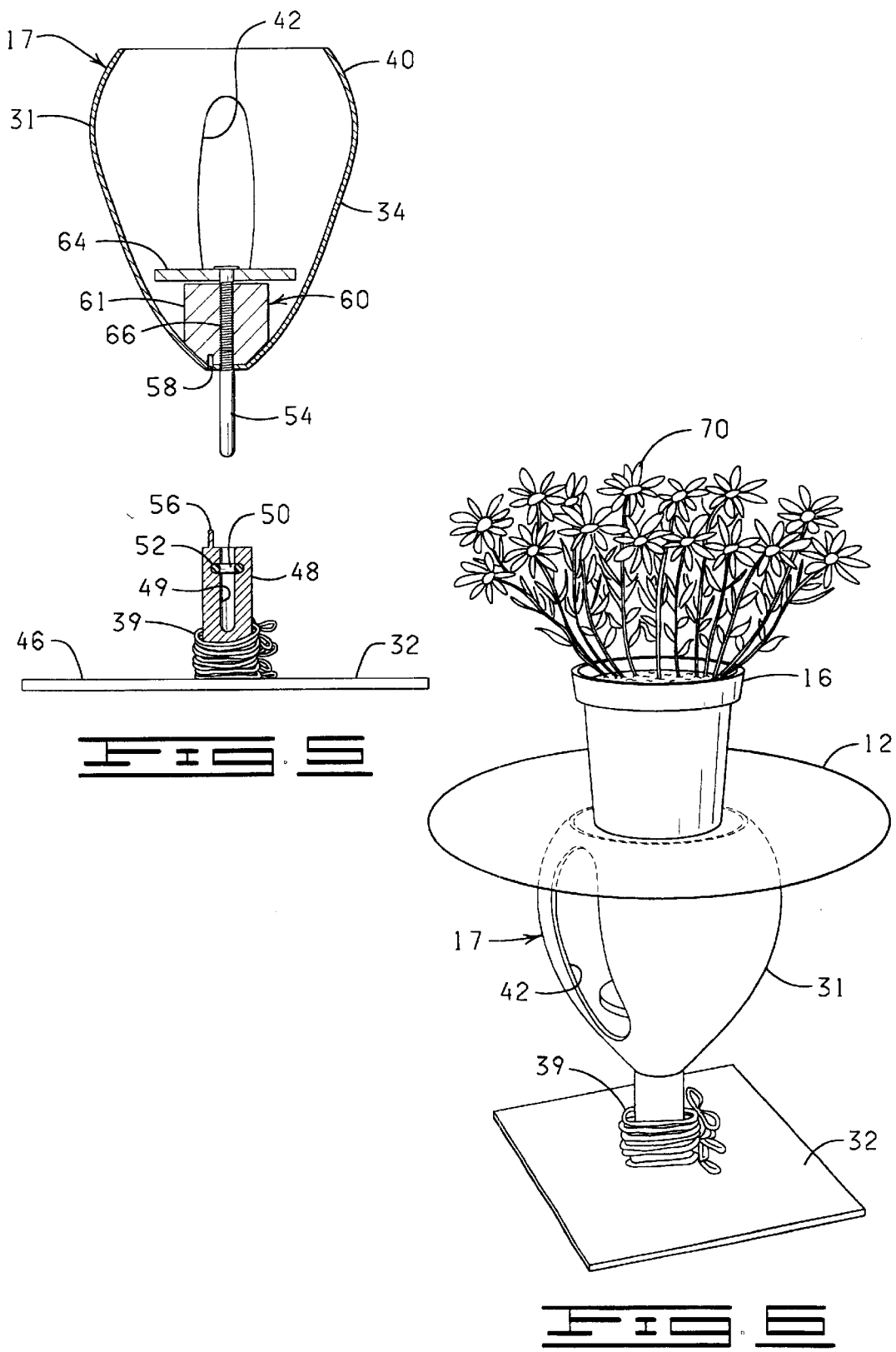

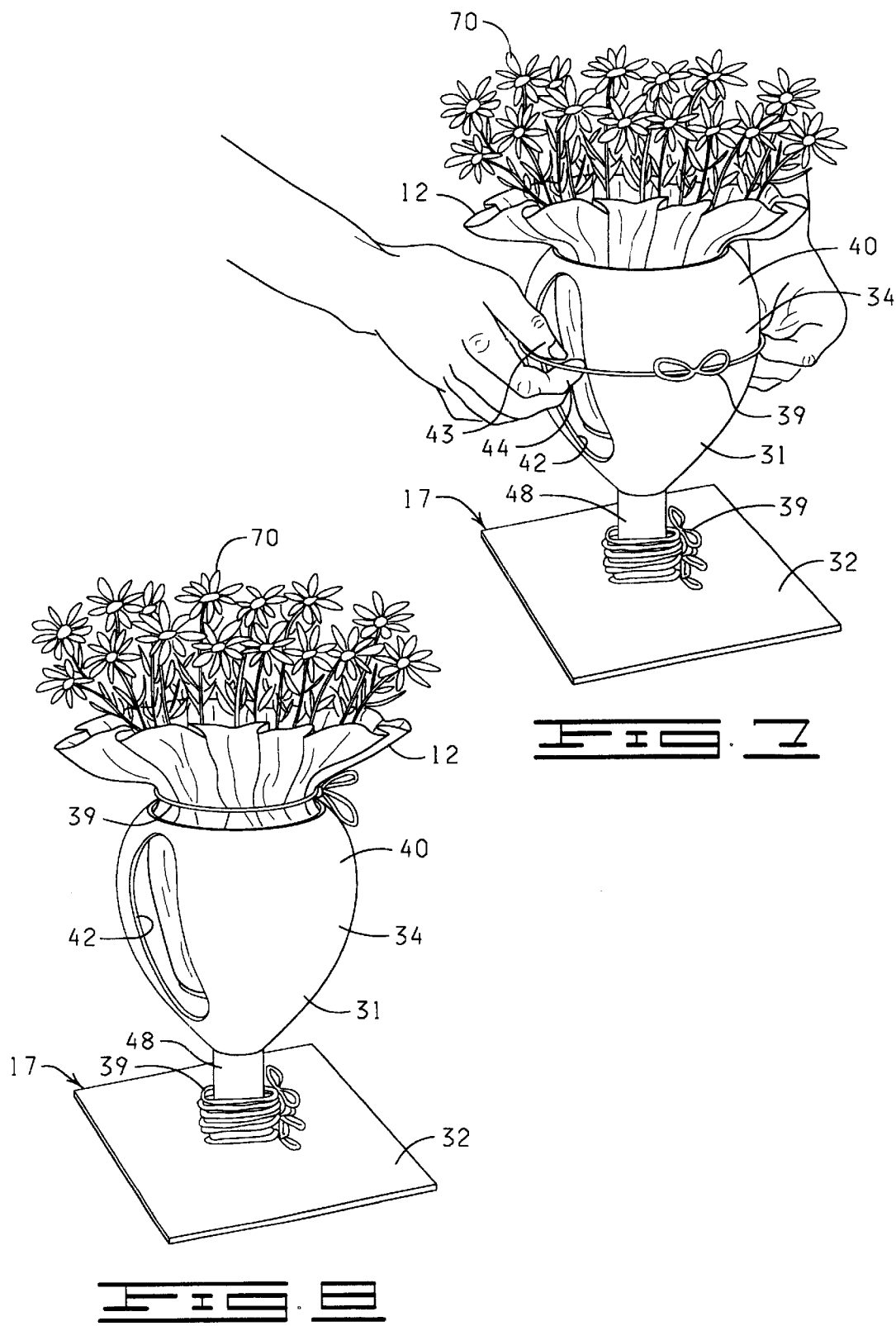

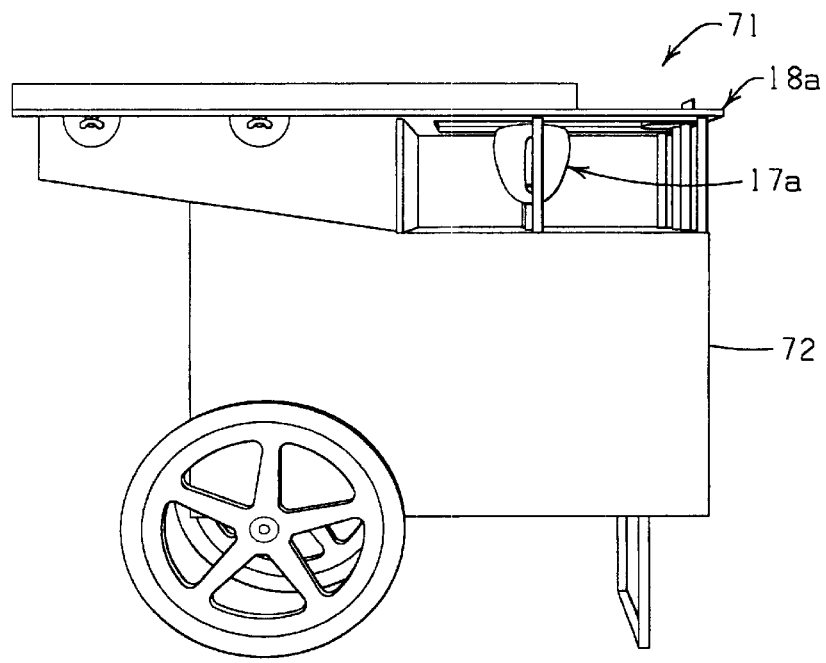
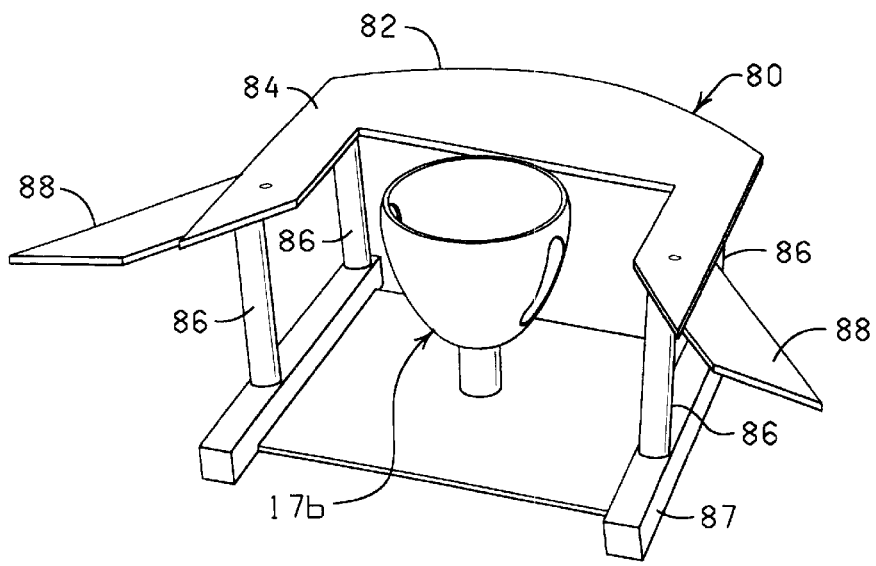
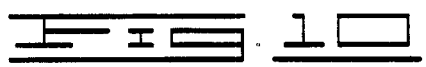

COVER FORMING APPARATUS

CROSS REFERENCE TO RELATED APPLICATIONS

This application is a continuation of U.S. Ser. No. 09/574,654, filed on May 18, 2000, U.S. Pat. No. 6,502,368 which claims priority to the provisional patent application identified by U.S. Serial No. 60/135,321, filed on May 20, 1999.

BACKGROUND OF THE INVENTION

1. Field of the Invention

The present invention relates generally to devices for forming a sheet of material about an object, and more particularly, but not by way of limitation, to an improved cover forming apparatus for a flower pot.

2. Brief Description of Related Art

In the florist and nursery industries, it is common to cover flower pots containing plants with sheets of material made of foil, paper, plastic films, and the like to enhance the aesthetic appearance of the potted plants. In addition, a cover serves several other useful functions. For example, covers made of waterproof material such as plastics and foil prevent leakage from the bottom of the pot. Also, light reflective material insulates the soil within the pot against temperature increases from overexposure to sunlight. Pot covers also serve to protect the soil, and to some extent, the foliage, from cold air. Further, pot covers may serve as padding during shipment of fragile pots and as a means for carrying the pots.

It is desirable for florists and growers to be able to form a cover about a potted plant and secure the cover about the potted plant in a simple, economical, and efficient manner. Thus, devices for forming and securing a sheet of material about a potted plant have previously been proposed. However, such devices are either complex devices designed to automatically secure the sheet of material about the flower pot or manual devices which are difficult to use repeatedly over an extended period of time.

To this end, a need exists for a cover forming apparatus that can form a cover about a potted plant in a simple, economical, and efficient manner and permit a securing device to be quickly and easily positioned about the cover to secure the cover to the pot. It is to such a cover forming apparatus that the present invention is directed.

SUMMARY OF THE INVENTION

The present invention is directed to a cover forming apparatus for forming and securing a sheet of material about a flower pot having an outer peripheral surface. The cover forming apparatus includes a base, a stem protruding upwardly from the base and adapted to hold a plurality of stretch loops, and a former. The former has a bowl shaped configuration and an open upper end, a lower end, a sidewall extending from the open upper end to the lower end, and a pot opening. The sidewall has an outer surface and an inner surface with the outer surface having an upper inwardly tapered portion. The pot opening is sized to receive at least a portion of the flower pot together with the sheet of material such that upon disposing the flower pot into the pot opening with the sheet of material positioned between the upper end of the former and the flower pot causes the sheet of material to be formed about the outer peripheral surface of the flower pot. The lower end of the former is detachably connected to the upper end of the stem such that at least one of the stretch loops disposed about the stem is removable from the stem and disposable on the upper inwardly tapered portion of the outer surface of the former in an expanded condition by an operator such that the stretch loop contracts and slides off the upper end of the former into engagement with the sheet of material thereby securing the sheet of material about the flower pot upon the stretch loop being released by the operator.

In another aspect, the present invention in directed to a method for forming and securing a sheet of material about a flower pot having an outer peripheral surface by positioning a plurality of stretch loops about a stem. A flexible sheet of material is positioned over a former which is connected to one end of the stem. The former has a bowl shaped configuration with an open upper end, a lower end, a sidewall extending from the open upper end to the lower end, and a pot opening. The sidewall has an outer surface and an inner surface with the outer surface having an upper inwardly tapered portion. The pot opening is sized to receive at least a portion of the flower pot together with the sheet of material. The flower pot is disposed into the pot opening with the sheet of material positioned between the upper end of the former and the flower pot thereby causing the sheet of material to be formed about the outer peripheral surface of the flower pot. One of the stretch loops is moved up the sidewall of the former and onto the upper inwardly tapered portion of the outer surface of the former. The stretch loop is caused to expand as the stretch loop is being moved up the sidewall. Upon the expanded stretch loop being moved onto the upper inwardly tapered portion of the outer surface of the former the stretch loop is caused to contract and thereby slide off the upper end of the former into engagement with the sheet of material thereby securing the sheet of material about the flower pot to provide a covered flower pot.

BRIEF DESCRIPTION OF THE SEVERAL VIEW OF THE DRAWINGS

FIG. 5 is a sectional, diagrammatic view of the forming-banding device showing a separation between a lower stem portion of and an upper bowl shaped portion with a bundle of hand tied stretch loops placed around the lower stem portion.

FIG. 6 is a perspective view of the forming-banding device illustrating the two opposing slots and a flower pot generally positioned above a sheet of material on the upper bowl portion of with a bundle of stretch loops placed around the lower stem portion.

FIG. 7 is a perspective view of the forming-banding device showing a flower pot passed through the opening of the forming-banding device with a sheet of material held in place about the outer peripheral surface of the flower pot and a single stretch loop being drawn up along the slotted outside surface of the bowl portion.

FIG. 8 is a perspective view of the forming-banding device showing the band of FIG. 7 after having been released so as to hold the sheet of material in place about the outer surface of the flower pot.

FIG. 9 is a perspective view of another embodiment of a cover forming apparatus constructed in accordance with the present invention.

FIG. 10 is a perspective view of another embodiment of a cover forming apparatus constructed in accordance with the present invention.

DETAILED DESCRIPTION OF THE INVENTION

Figure 1:
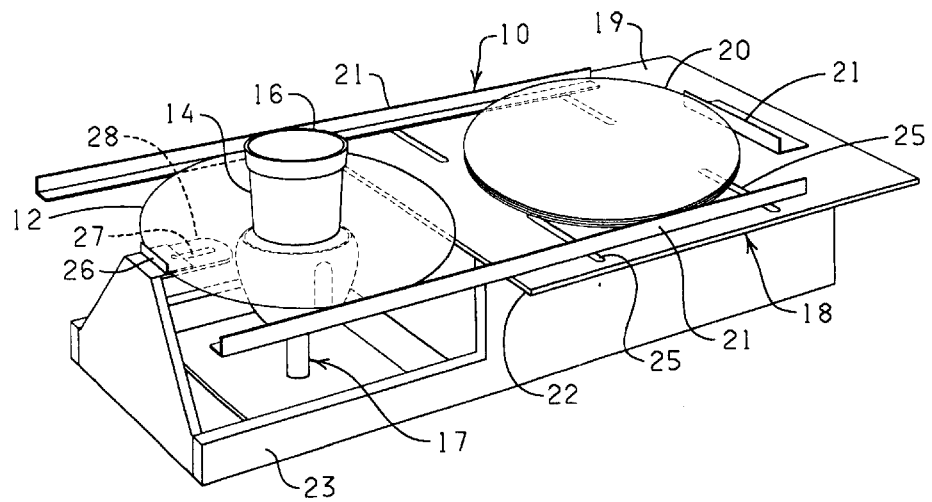
FIG. 1 is a perspective view of a cover forming apparatus constructed in accordance with the present invention.
Figure 2:
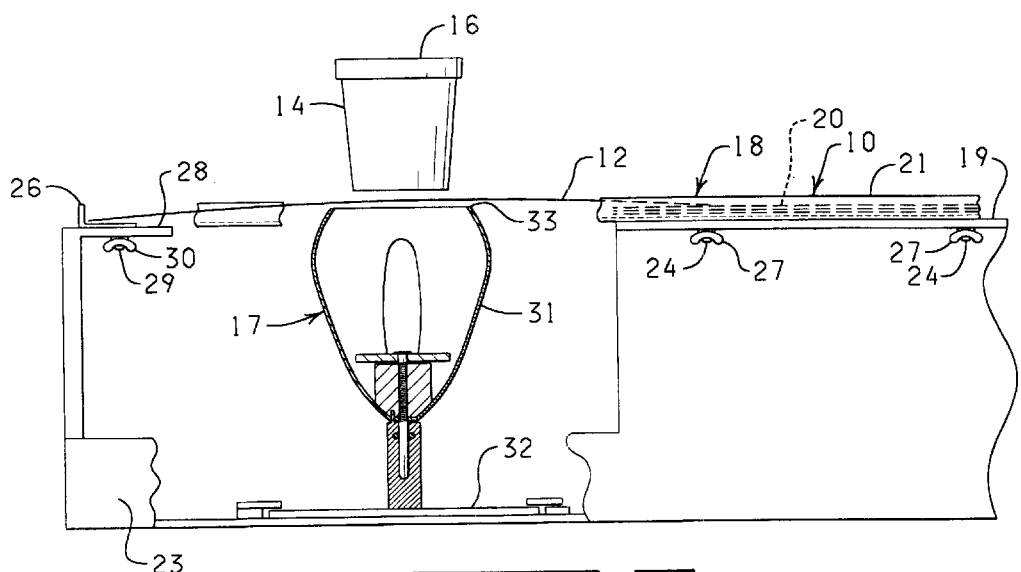
FIG. 2 is a sectional, diagrammatic view of the cover forming apparatus of FIG. 1.

Referring now to the drawings, and more particularly to FIGS. 1 and 2, shown therein is a cover forming apparatus 10 constructed in accordance with the present invention. The cover forming apparatus 10 is utilized for positioning and securing a sheet of material 12 generally about an outer peripheral surface 14 of a flower pot 16 generally for the purposes of providing a decorative cover for the flower pot 16. The cover forming apparatus 10 includes a forming-banding device 17 and a centering device 18.

The centering device 18 includes an elevated tray table 19 for supporting a stack of sheets of material 20, whereby individual sheets of material 12 may be moved and positioned so that they are generally centered over the forming-banding device 17. The centering device 18 may be constructed of painted plywood or particle board, metal, plastic or any other type of generally rigid and smooth material. The tray table 19 is bordered on three of its four sides by right angled plastic borders 21 with a side 22 adjacent to a tray extension 23 remaining open.

The borders 21 are adjustable to permit the centering device 18 to be serviceable with different size sheets of decorative, covering material 12. The open, or non-bordered side 22 is adjacent to the tray extension 23 which houses the forming-banding device 17. The side borders 21 are constructed of ninety-degree angle shaped lengths of plastic, such as PVC, ABS, or polypropylene which are commmon plastic extrusions. The side borders 21 extend the full length of the centering device 18, and are removable. The side borders 21 have pin protrusions 24 fastened to the bottom of the angled lengths of plastic which fit into a series of holes or slots 25 on the tray table 19 permitting the side borders 21 to be adjusted. The pin protrusions 24 on the bottom aspect of the side borders 21 are threaded allowing the side borders 21 to be tightened down on the tray table 19 with a wing handled fastener 27.

A stop 26 is provided on the tray table 19. The stop 26 includes a short piece of right angled plastic and has a bolt 29 threaded through an upper surface with the threaded portion of the bolt 29 protruding through a slot 27 provided through a stop guide 28. A wing handled fastener 30 (FIG. 2) is threadingly attached to the bolt 29 and positioned under the slotted stop guide 28 so as to serve as an adjustment to accommodate differently sized decorative sheet of material.

The forming-banding device 17 includes a rigid bowl portion or former 31 and a stemmed base 32. The forming-banding device 17 is detachably mounted to the centering device 18 with an upper horizontal edge 33 of the former 31 positioned slightly above the top of the tray table 19 (FIG. 2). The former-banding device 17 also serves as a manual stretch loop applicator. The terms "stretch loop" or "band" as used herein mean any material which may be secured about an object such as the flower pot 16 such as commonly referred to as hand tied stretch loops, elastic bands, or rubber bands and also any other type of material such as string, metal, plastic, or rubber which may be secured about an object such as the flower pot 16.

Figure 3:
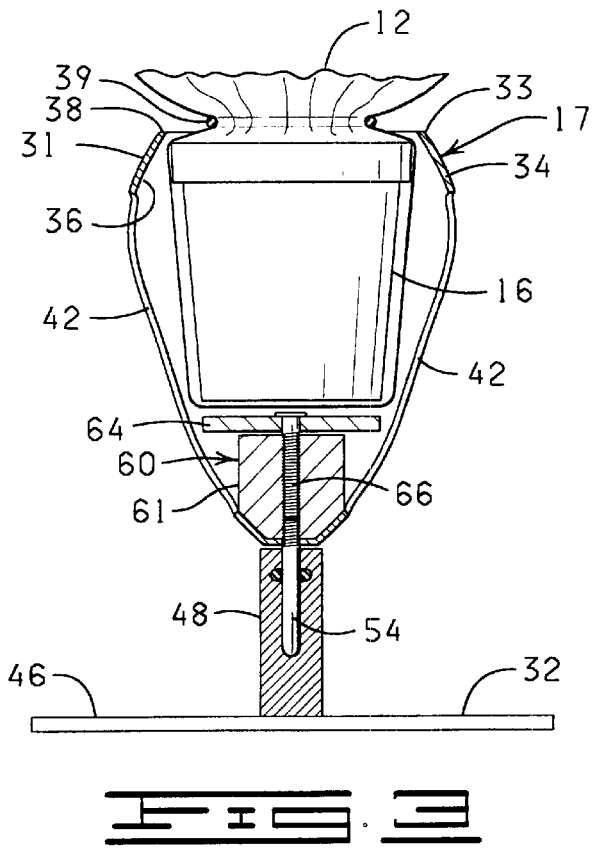
FIG. 3 is a sectional, diagrammatic view of a forming-banding device illustrating a flower pot moved into the opening of the forming-banding device with a sheet of material held in place about the outer peripheral surface of the flower pot with a band applied over the upper edge of the flower pot.
Figure 4:
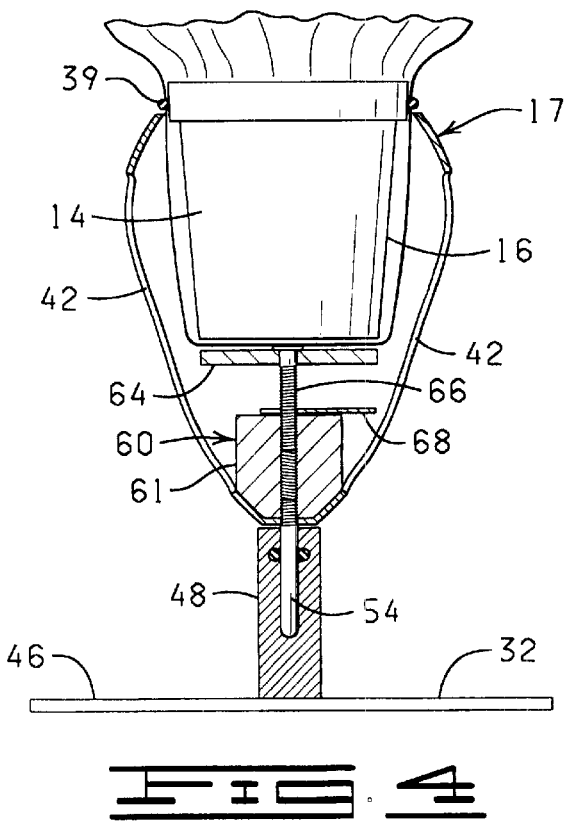
FIG. 4 is a sectional, diagrammatic view of the forming-banding device illustrating a flower pot positioned in a similar fashion as in FIG. 3 but with a band applied around the sheet and under the upper edge of the flower pot.

As illustrated on FIGS. 3, 4, and 5, the former 31 is generally a vertically oriented conical cylinder having an irregularly dimensioned outer surface 34 and correspondingly dimensioned interior surface 36 with an upper opening 38. The former-banding device 17 may be constructed from any type of rigid thermoplastic such as PVC, ABS, or styrene which can be vacuum-formed or molded and machined. The outer surface 34 of the former 31 has a smooth finish to allow a stretch loop 39 (FIG. 5) to be moved upwardly along the outer surface 34 so as to cause the stretch loop 39 to expand without substantial impedance. The upper opening 38 of the former 31 can be varied in diameter so as to accommodate various sized flower pots.

As best shown in FIG. 5, the outer surface 34 near the lower end of the former 31 is tapered outwardly while the outer surface 34 near the upper end of the former 31 is tapered inwardly, as designated by the reference numeral 40. This inwardly tapered surface 40 of the former 31 is referred to as a return surface. The return surface 40 facilitates positioning of the stretch loop 39 around the sheet of material 12 when the stretch loop 39 is released.

A pair of slots 42 as shown in FIGS. 3–6 are disposed opposite of each other and are open to both inside and outside surfaces of the former 31. The slots 42 facilitate the drawing up of individual stretch loops 39 by making a space available for an operator's thumbs 43 while using the forming-banding device 17 as shown in FIG. 7. Both of the slots 42 are of equal size and generally wide enough to accommodate a human thumb and two or three fingers 44. However, the slots 42 are terminated before intersecting the upper and lower edges of the former 31.

Shown in FIGS. 3, 4, and 5, the stemmed base 32 includes a base plate 46 which is square or round shaped and may be constructed of wood or plastic. A stem 48 made of plastic, steel, wood or any other smooth and rigid material protrudes upwardly and is attached to the base plate 46 via suitable fasteners. The stem 48 is provided with a bore 49 (FIG. 5) which extends from the top surface to within one third of the total length of the stem 48. An "O" ring groove 50 is cut into the inside wall of the bore 49 and fitted with an "O" ring 52 to ensure retention of a similarly dimensioned corresponding pin 54 which is attached to the former 31. A plastic or metal offset alignment pin 56 is placed into the upper surface of the stem 48 and a corresponding hole 58 is bored into the bottom of the former 31. Any other suitable device for attaching the stem 48 to the former 31 can be used so long as the smooth surfaces of either object are not compromised.

As shown in FIGS. 3–5, a depth stop assembly 60 is attached to the interior surface 36 of the former 31 in the bottom thereof. The depth stop assembly 60 is vertically adjustable so as to support the flower pot 16 up or down, thus allowing flexibility in attaching one of the stretch loop 39 over the upper horizontal edge of the flower pot 16, or in any other area under the upper edge of the flower pot 16. The depth stop assembly 60 includes a base 61 and a plate 64 provided with a threaded pin 66 threadingly engageable with the base 61. Thus, rotation of the plate 64 clockwise or counter clockwise adjusts the height of the plate 64 relative to the upper opening 38 of the former 31. The pin 66 can be locked in place with a locking lever 68 (FIG. 4) once the desired height has been set.

Operation

As illustrated in FIG. 5, the former-banding device 17 can be separated into two parts as described above to facilitate placing a bundle of stretch loops 39, or several bundles arranged in a clock like fashion on the stem 48 and thereby held in place loosely as opposed to tightly, thus allowing a single stretch loop 39 to be separated from the remaining loops 39 left in the bundle.

FIGS. 1 and 2 show the sheet of material 12 disposed between the former 31 and the flower pot 16. The sheet of material 12 is generally centered over the upper opening 38 of the former 31. This is accomplished by adjusting the side borders 21 of the tray table 19 on the centering device 18, and the stop 26 located on the opposite end of the tray extension 23. Adjustments are made relative to the size of the sheet of material being used at any given time. The sheet of material may be a shape sustaining material or non-shape sustaining material, such as cellophane, plastic, or a metalized film. Virtually any type of decorative sheet material may be used either as single sheets or as a plurality of sheets provided such films are flexible. The typical flower pot has perforations on the bottom end. It should be noted that if non-waterproof sheet material is to be used by this invention, for living plants, it should be used as an outer covering in combination with waterproof sheet material as an inner covering.

FIGS. 3, 4, and 7 show the flower pot 16 having been passed into the former 31. As the flower pot 16 passes into the former 31, the sheet of material 12 is caused to be formed about the outer peripheral surface 14 of the flower pot 16. The flower pot 16 and the sheet of material 12 are passed into the former 31 until making contact with the plate 64 of the depth stop assembly 60. As discussed, above, the depth stop assembly 60 is adjustable, which allows for changing the location or placement of the stretch loops 39 relative to the upper edge of the flower pot 16. For instance, if it is desirable to place the loop 39 over the upper edge of the flower pot 16, as shown in FIG. 4, and secure the sheet of material 12 about the stems of a plant 70 (FIGS. 3 and 8), the depth stop assembly 60 would be adjusted to its lowest position. This position allows the upper edge of the flower pot 16, to be in a position slightly lower than that of the upper edge of the former 31. Conversely, if it were desirable to place the stretch loop 39 over the outer peripheral surface 14 of the flower pot 16 as shown in FIG. 4), the depth stop assembly 60 would be adjustable to a more elevated position leaving the upper edge of the flower pot 16 positioned above the upper edge of the former 31.

Referring now to FIG. 7, once the sheet of material 12 has been caused to be formed about the flower pot 16, an individual grasps one of the stretch loops 39 with his thumbs 43 and fingers 44 and pulls one of the stretch loops 39 up from around the stem 48. Upon the individual positioning the stretch loop 39 adjacent to the slots 42, the individual may then release the stretch loop 39 which his thumbs 43 whereby his fingers 44 are positioned beneath the stretch loop 39 on opposite sides of the stretch loop 39. Each of the fingers 44 is then positioned through one of the corresponding slots 42 of the former 31. The slots 42 allow the individual to move the stretch loop 39 along the outer surface 34 of the former 31 without requiring the stretch loop 39 to be excessively stretched to accommodate the fingers 44 of the individual. The individual moves the stretch loop 39 upward along the outer surface 34 of the former 31 by moving his fingers 44 up through the slots 42 until the stretch loop 39 is positioned on the inward tapered surface 40. Upon the stretch loop 39 being positioned on the inward tapered surface 40, the stretch loop 39 is allowed to contract and slide off the former 31 and into engagement with the sheet of material 12.

Once the stretch loop 39 is placed on the sheet of material 12 and the flower pot 16, in the desired location, the flower pot 16 is easily removed from the former 31 by gently pulling on the sheet of material 12, the flower pot 16, or a combination of both in an upward direction.

As illustrated in FIGS. 6–8, the forming-banding device 17 may be used independently of the centering device 18, by removing the forming-banding device 17 from the tray extension 23. The use of the forming-banding device 17 in this manner is advantageous for covering small quantities of flower pots where a larger object such as the centering device 18 is not always feasible to use in a small work space. However, speed and efficiency would sometimes be compromised due to the time that may be lost by having to estimate the positioning of a sheet of material; such as the sheet of material 12, when the centering device 18 is not being utilized.

FIG. 9 illustrates another version of a cover forming apparatus 71 constructed in accordance with the present invention. The cover forming apparatus 71 includes a centering device 18a and forming-banding device 17a mounted to a wheeled cart 72 which may provided with a built-in cabinet. The centering device 18a and the forming-banding device 17a are substantially identical in construction to the centering device 18 and the forming-banding device 17 described above. One of the advantages of the cover forming apparatus 71 is that all related task specific paraphernalia is transportable in the cart 72, thereby increasing the utility and maneuverability of the cover forming apparatus 71. The increase in utility that the cover forming apparatus 71 provides is especially important in greenhouses where floral growers process plants without the use of tables. Often floral growers place flower pots on the floor of greenhouses, which do not allow the handling of flower pots in a comfortable and efficient manner. The cover forming apparatus 71 also permits the positioning of the centering device 18a and the forming-banding device 17a at waist level such as is afforded by common greenhouse work tables.

FIG. 10 illustrates another embodiment of a cover forming apparatus 80 which includes a centering device 82 and a forming-banding device 17b. The forming-banding device 17b is substantially similar to the forming-banding devices 17 and 17a described above. The centering device 82 includes a U-shaped sheet support member 84 supported by a plurality of support members 86 extending from a base 87. The forming-banding device 17b is removably attachable to the base 87.

The sheet support member 84 has a pair of extension members 88 pivotally attached to the terminal ends of the sheet support member 84. Upon attaching the forming-banding device 17b to the base 87 of the centering device 82, the extension members 88 can be rotated inwardly so as to cooperate with the support member 84 to support a sheet of material above the forming-banding device 17b.

Figure 11:
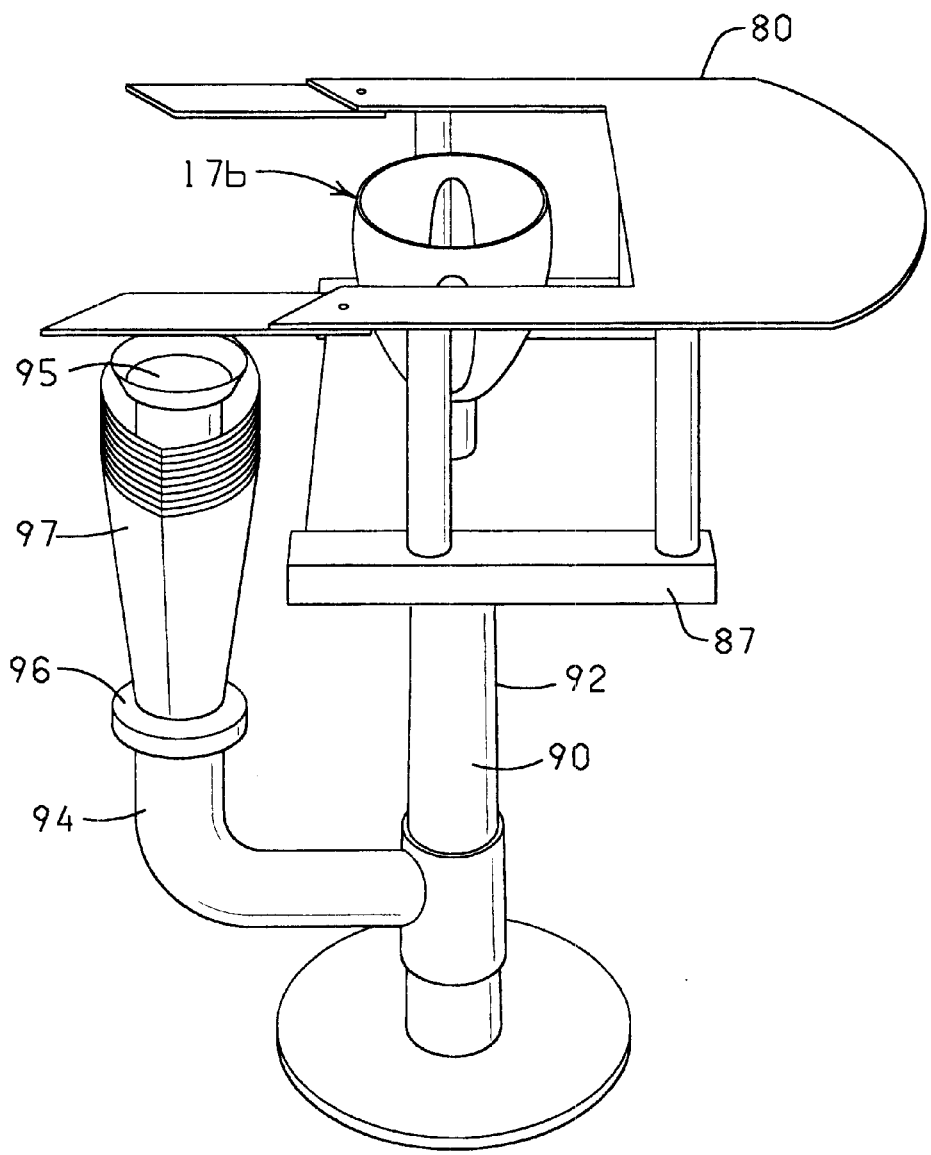
FIG. 11 is perspective view of the cover forming apparatus of FIG. 10 illustrated in combination with a sleeve stand.

As illustrated in FIG. 11, the cover forming apparatus 80 is adapted to be used in combination with a sleeve stand 90 to further enhance the convenience and utility of the above described devices. The sleeve stand 90 includes a central pedestal 92 which is adapted to support the base 87 of the cover forming apparatus 80. The sleeve stand 90 further includes a sleeve support member 94 which extends a distance away from the central pedestal 92. The sleeve support member 94 has an upper support surface 95 and a sleeve support surface 96 spaced a distance below the upper support surface 95.

In use, a plurality of nested sleeves 97 are positioned on the sleeve support member 94 such that the lower end of the sleeves 97 are engaged with the sleeve support surface 96. The cover forming apparatus 80 is then used to cover a flower pot, such as the flower pot 16 described above, with a sheet of material. The covered flower pot cover is next transferred from the forming-banding device 17b to the upper support surface 95. One of the sleeves 97 is then pulled up around the covered flower pot, and the sleeved flower pot is removed from the upper support surface 95.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A cover forming apparatus for forming and securing a sheet of material about a flower pot having an outer peripheral surface, comprising: a former having a bowl shaped configuration with an open upper end, a lower end, a sidewall extending from the open upper end to the lower end, a pot opening, and a pair of oppositely disposed slots, the sidewall having an outer surface and an inner surface with the outer surface having an upper inwardly tapered portion, the pot opening sized to receive at least a portion of the flower pot together with the sheet of material such that upon disposing the flower pot into the pot opening with the sheet of material positioned between the upper end of the former and the flower pot the sheet of material is formed about the outer peripheral surface of the flower pot, the lower end of the former adapted to receive at least one stretch loop so that the stretch loop is disposable on the upper inwardly tapered portion of the outer surface of the former by an operator such that the stretch loop slides off the upper end of the former into engagement with the sheet of material thereby securing the sheet of material about the flower pot upon the stretch loop being released by the operator, the pair of oppositely disposed slots extending through the sidewall and extending from near the lower end of the former toward the upper end so as to intersect the upper inwardly tapered portion of the outer surface of the former to facilitate moving the stretch loop to the upper inwardly tapered surface by the operator by providing a space sized to accommodate a finger of the operator.

2. The cover forming apparatus of claim 1 further comprising:
a depth stop assembly positioned in the former, the depth stop having a plate which is vertically adjustable so to support the flower pot within the former at a selected position relative to the upper end of the former.

3. The cover forming apparatus of claim 1 further comprising:
a centering device having an elevated tray table for supporting a stack of sheets of material such that individual sheets of material may be moved from the stack of sheets of material and generally centered over the pot opening of the former.

4. The cover forming apparatus of claim 3 wherein the centering device has a tray extension adapted to support the former.

5. The cover forming apparatus of claim 4 wherein the former is connected to the tray extension such that the upper end of the former extends above the elevated table.

6. The cover forming apparatus of claim 4 wherein the centering device is mounted to a wheeled cart having a storage cabinet.

7. A cover forming apparatus for forming and securing a sheet of material about a flower pot having an outer peripheral surface, comprising:
a former having a bowl shaped configuration with an open upper end, a lower end, a sidewall extending from the open upper end to the lower end, a pot opening, and a pair of oppositely disposed slots, the sidewall having an outer surface and an inner surface with the outer surface having an upper inwardly tapered portion, the pot opening sized to receive at least a portion of the flower pot together with the sheet of material such that upon disposing the flower pot into the pot opening with the sheet of material positioned between the upper end of the former and the flower pot the sheet of material is formed about the outer peripheral surface of the flower pot, the lower end of the former adapted to receive at least one stretch loop so that the stretch loop is disposable on the upper inwardly tapered portion of the outer surface of the former by an operator such that the stretch loop slides off the upper end of the former into engagement with the sheet of material thereby securing the sheet of material about the flower pot to provide a covered flower pot upon the stretch loop being released by the operator, the pair of oppositely disposed slots extending through the sidewall and extending from near the lower end of the former toward the upper end so as to intersect the upper inwardly tapered portion of the outer surface of the former to facilitate moving the stretch loop from the lower end of the former to the upper inwardly tapered surface by the operator by providing a space sized to accommodate a finger of the operator; and
a sleeve stand having a central pedestal adapted to support the former and a sleeve support member which extends a distance away from the central pedestal, the sleeve support member having a pot support surface and a sleeve support surface spaced a distance below the pot support surface, the sleeve support surface sized to support a plurality of nested sleeves whereby when the nested sleeves are positioned about the sleeve support member, the covered flowerpot cover can be transferred from the former to the upper support surface where one of the sleeves is pulled up around the covered flower pot.

8. The cover forming apparatus of claim 7 further comprising:
a depth stop assembly positioned in the former, the depth stop having a plate which is vertically adjustable so to support the flower pot within the former at a selected position relative to the upper end of the former.

9. A method for forming and securing a sheet of material about a flower pot having an outer peripheral surface, comprising:
positioning at least one stretch loop about a lower end of the former;
positioning a flexible sheet of material over a former, the former having a bowl shaped configuration with an open upper end, a lower end, a sidewall extending from the open upper end to the lower end, and a pot opening, the sidewall having an outer surface and an inner surface with the outer surface having an upper inwardly tapered portion, the pot opening sized to receive at least a portion of the flower pot together with the sheet of material;

disposing the flower pot into the pot opening with the sheet of material positioned between the upper end of the former and the flower pot thereby causing the sheet of material to be formed about the outer peripheral surface of the flower pot; and moving at least one of the stretch loops up the sidewall of the former by positioning a finger beneath the stretch loop on opposite sides of the stretch loop and moving each of the fingers through a corresponding slot extending through the sidewall of the former and extending from near the lower end of the former toward the upper end so as to intersect the upper inwardly tapered portion of the outer surface of the former so as to position the stretch loop on the upper inwardly tapered portion of the outer surface of the former thereby causing the stretch loop to expand as the stretch loop is being moved up the sidewall and to contract and slide off the upper end of the former into engagement with the sheet of material thereby securing the sheet of material about the flower pot to provide a covered flower pot upon the expanded stretch loop being moved onto the upper inwardly tapered portion of the outer surface of the former.

10. The method of claim 9 further comprising:

providing a sleeve stand having a central pedestal adapted to support the former and the former and a sleeve support member which extends a distance away from the central pedestal;

disposing a plurality of nested sleeves about the sleeve support member, the sleeve support member having a pot support surface;

positioning the covered flower pot on the pot support surface; and pulling one of the sleeves up and around the covered flower pot.

* * * * *